(No Model.)
J. W. FLEMING.
Combined Cultivator and Harrow.
No. 241,855.        Patented May 24, 1881.
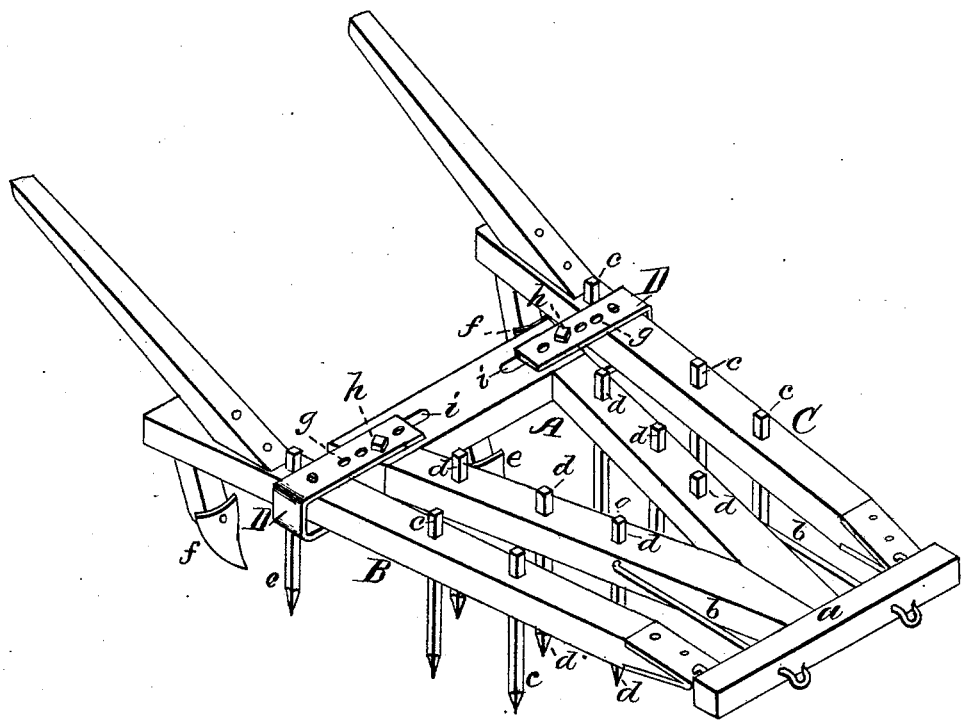
Witnesses:
H. C. McArthur
Clarence L. Truitt
Inventor:
James W. Fleming
per Chas. H. Fowler
Attorney.

UNITED STATES PATENT OFFICE.

JAMES W. FLEMING, OF ASPEN, COLORADO.

COMBINED CULTIVATOR AND HARROW.

SPECIFICATION forming part of Letters Patent No. 241,855, dated May 24, 1881.

Application filed March 28, 1881. (No model.)

*To all whom it may concern:*

Be it known that I, JAMES W. FLEMING, a citizen of the United States, residing at Aspen, in the county of Gunnison and State of Colorado, have invented certain new and useful Improvements in Combined Cultivator and Harrow; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention has reference to certain new and useful improvements in the combined cultivator and harrow for which a patent was granted to me April 20, 1880, No. 226,656. The wings of the cultivator and harrow were limited in their lateral movement to or from the central triangular frame by segmental guide-bars extending across the frame, upon the upper and lower sides thereof, and projecting a sufficient distance beyond to form guides for the wings, and by pins passing through the ends of the bars, against which the outer sides of the wings abutted when brought to their greatest extent in a direction from the central triangular frame. It has been found by practical experience that the lateral pressure against the pins which pass through the ends of the segmental guide-bars was so great as to frequently twist said pins and ends of the bars out of shape, for reasons that when the wings were adjusted to accommodate them to the width of row or passage between the corn, &c., there were no means provided for holding or fastening them in the position thus adjusted, and consequently their liability to injure the pins and ends of the bars, as above stated.

The object of the present invention is to remove, as far as possible, the above-mentioned difficulties, and to produce an implement possessing strength and durability and that is perfect in its operation. These objects I attain by the construction substantially as shown in the accompanying drawing, and hereinafter described.

In the drawing, which represents a perspective view of my invention, A is the triangular frame secured to cross-beam $a$, and braced by rods $b$.

To the cross-beam $a$ are connected the ends of wings B C, which are provided with suitable cultivator teeth $c$, as is also the frame A, the teeth $d$ being of the usual construction. The frame A has, in addition to the cultivator-teeth, one or more shovels or plows, $e$, and the wings B C shovels or plows $f$. These shovels or plows may be of the ordinary kind, and, if desired, they may be so connected to the frame and wings as to admit of their removal and cultivator teeth substituted in their place, as circumstances require, as I do not wish to be understood as confining myself to any particular number of harrow-teeth, or shovels, or plows; nor do I limit myself to the form and construction shown.

The several parts above referred to are the same as shown and described in my former patent, and further allusion to them, only so far as to describe my improvement, is considered unnecessary.

The essential feature of my invention, which I will now describe, consists in the manner of connecting the wings B C to the rear end of the frame A. Band-irons D are bent around to embrace the upper and lower sides of the wings B C, to which said band-irons are secured by screws, bolts, or other fastenings. The ends of the band-irons D are of sufficient length for attachment to the rear of the triangular frame A and allow of the necessary adjustment to or from said frame. Each one of the band-irons D has a series of holes, $g$, for the reception of a bolt, $h$, which passes through the holes in the band-iron, and through an elongated slot, $i$, in the rear of the frame A. These band-irons are intended to be made of wrought-iron or of cast-iron, as found desirable, but can be constructed of any suitable metal possessing sufficient strength.

When it is found necessary to regulate the width of the implement by adjusting the wings B C to or from the frame A, as the case may be, the bolts $h$ are withdrawn and replaced in the proper holes $g$, after the wings have been moved, at the required distance from the frame. This means of fastening securely holds the wings from being shifted too far outward in a lateral direction, while at the same time they have the necessary play in a direction toward the frame without any great degree of strain on the bolts or band-irons.

Having now fully described my invention, what I claim as new, and desire to secure by Letters Patent, is—

The triangular frame A, connected to the cross-beam $a$ and having the teeth $d$ and shovel or plow $e$, and at its rear end elongated slots $i$, in combination with the wings B C, connected to the beam $a$, said wings having connected thereto strap-irons D, with holes $g$, and fastened to the frame by suitable bolts $h$, passing through said holes and through the slots $i$, as and for the purpose set forth.

In testimony whereof I affix my signature in presence of two witnesses.

JAMES W. FLEMING.

Witnesses:
FRANK M. THOMPSON,
G. W. TRIPLETT.